(No Model.)

E. BARNHARD & A. F. THOMAS.
GRAIN HARVESTING MACHINE.

No. 298,054. Patented May 6, 1884.

Attest.
Sidney P. Hollingsworth
Harry Shipley

Inventor.
Elias Barnhard
A. F. Thomas.
By Philip T. Dodge
Attorney.

N. PETERS, Photo-Lithographer, Washington, D. C.

UNITED STATES PATENT OFFICE.

ELIAS BARNHARD AND AARON F. THOMAS, OF TROY, OHIO.

GRAIN-HARVESTING MACHINE.

SPECIFICATION forming part of Letters Patent No. 298,054, dated May 6, 1884.

Application filed August 1, 1883. Renewed March 27, 1884. (No model.)

*To all whom it may concern:*

Be it known that we, ELIAS BARNHARD and A. F. THOMAS, of Troy, in the county of Miami and State of Ohio, have invented certain Improvements in Grain-Harvesting Machines, of which the following is a specification.

The purpose of this invention is to provide means whereby harvesting-machines may be adjusted at will to cut a swath of greater or less width, as circumstances may render advisable; and to this end it consists in combining with a cutting mechanism a divider or dividers, located at one or both ends of said mechanism, movable in such manner that they may be caused to shield and render inoperative the end of the cutter for a greater or less distance.

The invention also consists in various details of construction, which will be hereinafter described.

The essence of the invention consists in the provision of adjustable means whereby a portion of the cutting devices may be prevented from acting upon the grain, or, in other words, the operative portion of the cutter varied in length; and it will be manifest to the skilled mechanic, after an examination of this specification, that various constructions may be adopted to this end.

In the accompanying drawings we have represented a simple and advantageous arrangement, which is the best known to us at the present day.

Figure 1:
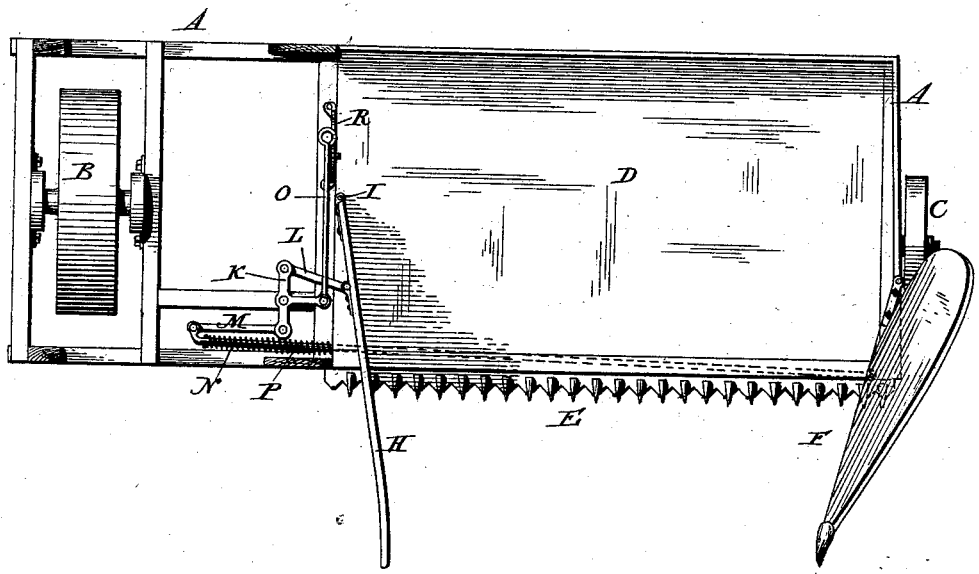
Figure 2:
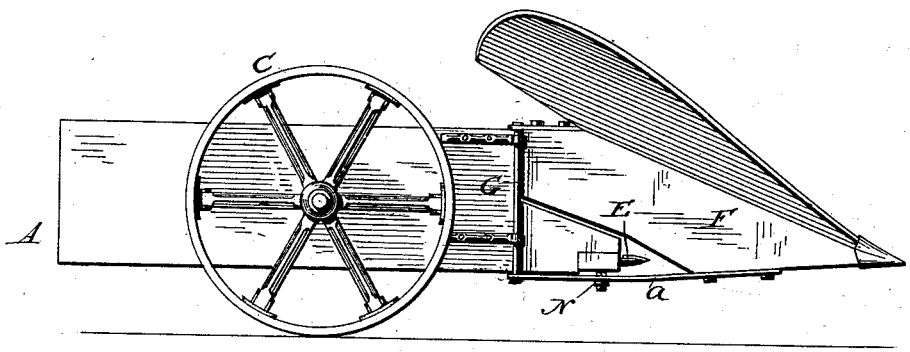

Referring to the accompanying drawings, Figure 1 represents a top plan view of a harvesting-machine provided with our improvements. Fig. 2 is an elevation of the same, looking against the outer or grain side.

Except as to the particulars hereinafter enumerated, the machine may be of any ordinary construction; and as the invention has no reference to the driving or raking mechanisms it is deemed unnecessary to illustrate the same herein.

Referring to the drawings, A represents the main frame; B, the main wheel; C, the grain-wheel; D, the grain-receiving platform; and E, the cutting mechanism located at the forward edge of the platform, and consisting, as usual, of a serrated knife reciprocating through a series of stationary guard-fingers.

F represents a divider located at the outer or grain side of the machine, and extending forward of the cutter-bar, this divider being substantially of the ordinary form. Instead of being stationary, as usual, the divider is mounted, as shown in Figs. 1 and 2, in rear of the cutter-bar on a vertical pivot or hinge, G, which admits of its forward end or point swinging horizontally. The arrangement is such that when the divider is swung outward it will expose the entire length of the cutter-bar and admit of the grain passing freely thereto, but when it is swung inward it will pass over or above the outer end of the cutter-bar, and by excluding the grain from such portion diminish the length of the operative portion, and thereby reduce the width of the cut of the machine.

At the inner end of the platform there is a second divider, H, which is hinged at its rear end, I, and extended forward of the cutter-bar, so that its forward end may move horizontally over the inner end of the cutter-bar, and render a greater or less portion of the same inoperative by excluding the grain therefrom, its action in this regard being identical with that of the outer divider.

For the purpose of enabling the operator to adjust the two dividers simultaneously, and without dismounting from the machine or arresting its action, I mount at any suitable point upon the frame a centrally-pivoted lever, K, one end of which is connected by a rod, L, to the inner divider, H, while the opposite end is connected by a rod, M, to a second rod, N, which latter is extended beneath the finger-bar to the outer side of the machine, and there connected to the outer divider, F, either directly or through the medium of an arm, *a*, mounted on the hinge-pin of the divider, as shown in Fig. 2. The lever K is provided with a laterally-extended arm, connected to a rod, O, which will be extended backward to a point adjacent to the driver's seat. When the rod O is moved in one direction, the intermediate connections cause the two dividers to be moved inward toward each other, thus reducing the width of the cut; but on moving the rod in the opposite direction the dividers are moved outward from each other toward the ends of the cutter-bar, thus increasing the width of the cut. The rod O may be connected with a hand-lever, foot-lever, or other operating device, if preferred, and a locking mechanism of suitable character may be employed to hold the parts in position. I prefer to provide the rod N with a spiral spring, P, which tends to maintain the dividers in their innermost positions and to return them to such positions after they have been separated. When this spring is employed, it will be necessary for the operator to hold the lever against the action of the spring during the periods when the dividers are separated, unless means are provided for locking the parts against the action of the spring.

In Fig. 2, R represents a notched bar mounted upon the frame, and arranged to receive a stud on the side of the rod, for the purpose of thus locking the parts. It is manifest that any equivalent devices may be employed.

While it is preferred to employ two movable dividers—one at each end of the cutter-bar—it is manifest that either one may be employed alone.

The dividers may be made of any suitable form, hinged at their rear ends or at other suitable points, or arranged to slide inward and outward upon guides, the only requirement being that they shall be movable lengthwise of the cutters in such manner as to render the same inactive through a greater or less portion of their length.

We are aware that harvesters have been provided with dividers the forward ends of which were adjustable horizontally, in order to adapt them to embrace within their grasp more or less grain, the length of the cutter-bar remaining unchanged, and to such construction we lay no claim, our invention being limited to a machine wherein the active or operative portion of the cutter-bar may be increased or diminished in length.

Having thus described our invention, what we claim is—

1. In a grain-harvesting machine, the combination of a cutter mechanism, substantially as described, and a divider or guard movable lengthwise over the end of the cutter to render a portion of the same inoperative, substantially as described and shown, whereby the width of the machine may be increased and diminished.

2. In a harvesting-machine, the combination, with an ordinary cutting mechanism such as shown, of a horizontal swinging divider, hinged in rear of the cutter and extended forward across the same to render a portion of the cutter inoperative, substantially as described.

3. In a harvesting-machine, the combination of a cutting mechanism, substantially as described, and two movable dividers or guards located at opposite ends of said cutting mechanism, and adjustable inward past the extremities of the same, substantially as described, whereby the extremities of the cutter may be rendered inoperative and the width of cut thereby reduced.

4. In a harvesting-machine, the combination of a cutting mechanism, substantially as described, a guard or divider movable over the end of the cutter to prevent the access of the grain thereto, and thereby render a portion of its length inoperative, and mechanism, substantially as described, to adjust said guard, extending thence to a point adjacent to the driver's seat, whereby the driver is enabled to vary the width of the cut at will while the machine is in action.

5. In combination with the cutting mechanism, the two movable dividers, and operating mechanism, substantially as described, connected with both dividers, whereby the two may be adjusted simultaneously.

ELIAS BARNHARD.
AARON F. THOMAS.

Witnesses:
H. H. WILLIAMS,
T. C. BOND.